Jan. 11, 1949.                R. A. DOHL                2,459,065
              PLATTER AND PLATTER SUPPORT FOR POSTAL SCALES
Filed Dec. 7, 1945                                 2 Sheets-Sheet 1
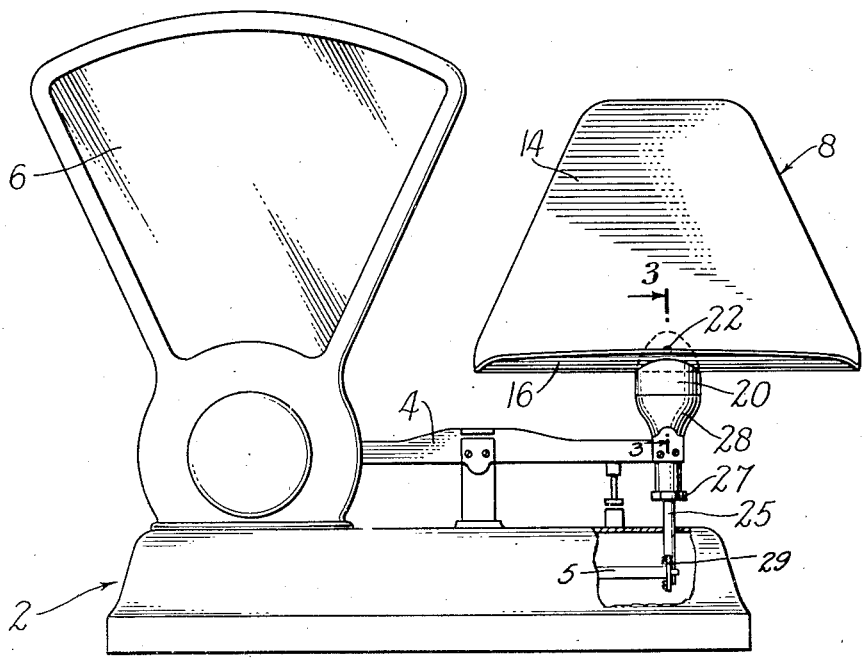
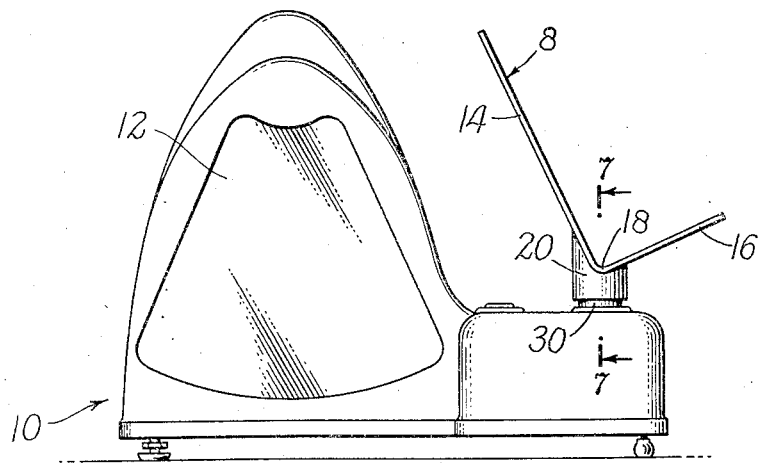
INVENTOR
Robert A. Dohl
BY
Blair, Curtis + Hayward
ATTORNEYS Jan. 11, 1949.   R. A. DOHL   2,459,065
PLATTER AND PLATTER SUPPORT FOR POSTAL SCALES
Filed Dec. 7, 1945   2 Sheets-Sheet 2
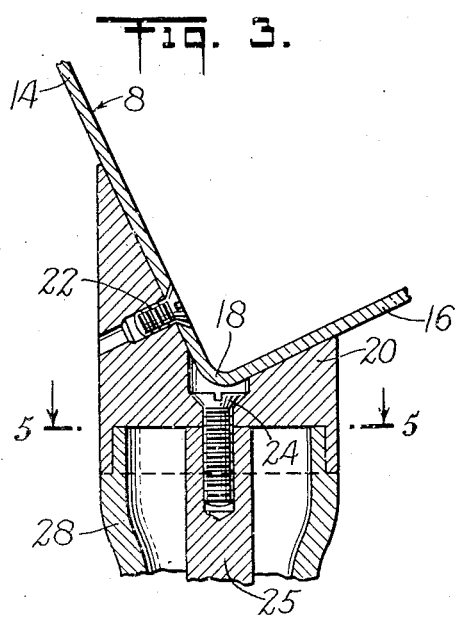
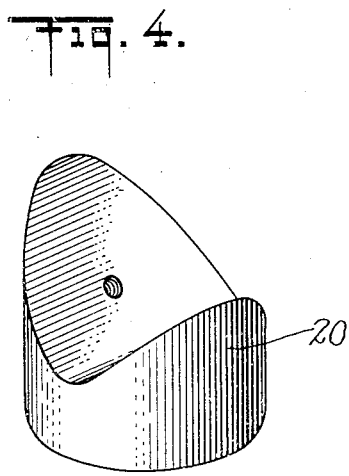
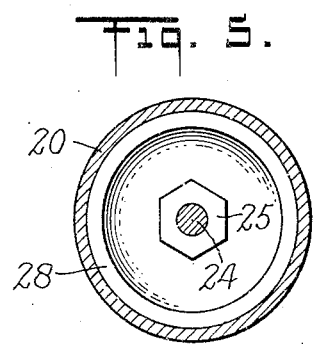
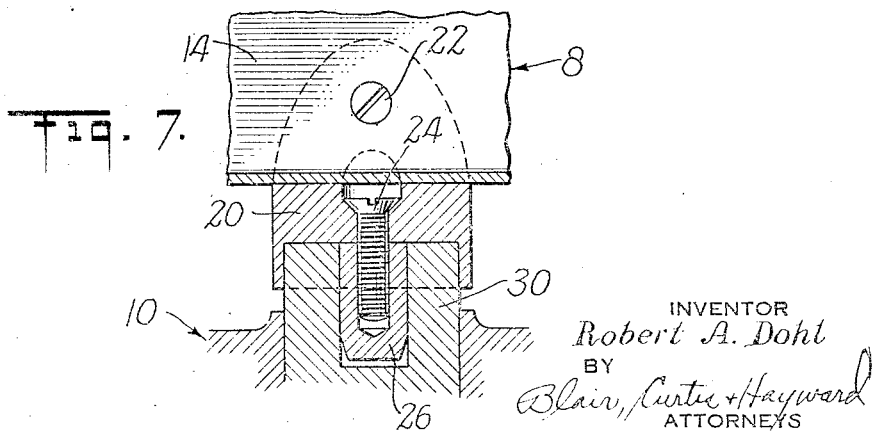
INVENTOR
Robert A. Dohl
BY
Blair, Curtis & Hayward
ATTORNEYS Patented Jan. 11, 1949

2,459,065

UNITED STATES PATENT OFFICE 2,459,065

PLATTER AND PLATTER SUPPORT FOR POSTAL SCALES

Robert A. Dohl, Rochester, N. Y., assignor to Commercial Controls Corporation, a corporation of Delaware Application December 7, 1945, Serial No. 633,293

4 Claims. (Cl. 265—73)

This invention relates to weighing mechanism, and more in particular to scales for weighing a stack of loose envelopes, small packages, or the like. An object of this invention is to provide apparatus of the above character which is simple and lightweight in construction and yet which is sturdy and durable, and which is adaptable for use under widely varying conditions. A further object is to provide a removable mail-supporting platter which is adapted for use with various types of scales. These and other objects will be in part obvious and in part pointed out below.

The invention accordingly consists in the features of construction, combinations of elements, and arrangements of parts as well as exemplified in the structure to be hereinafter described and the scope of the application of which will be indicated in the following claims.

In the drawings:

Figure 1 is a front elevation with parts broken away of postal scales which includes a mail-supporting platter assembly representing one embodiment of the invention;

Figure 2 is similar to Figure 1 and shows another type of postal scales which is provided with the same mail-supporting platter as in Figure 1, but in Figure 2 the mail-supporting platter is shown in side-elevation;

Figure 3 is an enlarged sectional view on the line 3—3 of Figure 1;

Figure 4 is an enlarged perspective view of the base member which supports the platter;

Figure 5 is a horizontal section on the line 5—5 of Figure 3;

Figure 6 is a perspective view of the cap-plug which appears in Figure 7; and,

Figure 7 is an enlarged sectional view on the line 7—7 of Figure 2.

In weighing envelopes, small packages, and the like, difficulty has been encountered in providing a satisfactory scale platform or platter which will handle all of the types and sizes of articles which are used by an office. For example, it should be possible to weigh a single envelope or package or a relatively large stack of envelopes or packages with ease. Furthermore, from a commercial standpoint it should be possible to use one platter on various types of scales.

In accordance with the present invention, the above objects are satisfied by providing a through-like platter supported at its center by a single base member and having two opposite sides which extend upwardly and in opposite directions from the base member. Referring particularly to Figure 1 of the drawings, a set of postal scales 2 has a balance arm 4, a beam arm 5 within the base of the scales, an indicating-scale assembly 6 and a mail-supporting platter 8. Platter 8 is shown in Figure 2 in side elevation mounted on another type of postal scales 10 which scales has an indicating-scale assembly 12.

Platter 8 is formed by a single sheet of metal bent to form two supportting walls 14 and 16 which extend oppositely from a groove 18. Wall 14 extends substantially at sixty degrees from the horizontal and wall 16 extends substantially thirty degrees from the horizontal and wall 14 is substantially twice the width of wall 16. The edges of the two walls are tapered as shown in Figure 1 so that the maximum length of the platter is at groove 18. Platter 8 is mounted on a base member 20 (see also Figure 4), and is held by a screw 22 (see Figure 3), which extends through wall 14 and is threaded into the base member.

Base member 20 has a cylindrical recess in its lower end (Figure 3), and at the center of the lower end of the base member is a screw 24. Scales 2 is provided with an adapter head 28 which has a central stud 25 which is cylindrical at the bottom, but which has at the top a hexagonal portion into which screw 24 is threaded, and the upper end of the adapter head is rabbeted to fit the recess in the lower end of base member 20. As shown in Figure 1, stud 25 extends through the bottom of head 28 and is provided with a locknut 27. The lower end of stud 25 has clamped thereto a plate 29 which is provided with an opening which has knife edges along its top and bottom. The right-hand end of beam arm 5 projects through this opening in plate 29 and is engaged by the knife edges so that there is a swinging interengagement between stud 25 and beam arm 5. During adjustment of the scales for the purpose of paralleling balance arm 4 and beam arm 5 locknut 27 is first loosened and then screw 24 is turned to adjust stud 25 up or down to the proper position in head 28 and with respect to base member 20. Locknut 27 is then tightened up and this holds head 28 and base member 20 rigidly together, and it also locks the adjustment of screw 24 in stud 25 and this locks the balancing arm 4 in parallel relationship with respect to beam arm 5. The annular space within head 28 and around the upper end of stud 25 is adapted to receive bird-shot for balancing of the scales.

As shown best in Figure 7 scales 10 is provided with a similar adapter head 30 which is recessed at its center to receive a plug-cap 26 into which screw 24 is threaded and the adapter head 30 is snugly received in the lower end of base member 20. Thus, the single platter may be used on either type of scales; that is, for scales 2 screw 24 is threaded into stud 25, and for scales 10 the screw is threaded into a plug-cap 26. Stud 25 provides the attachment between the platter and the adaptor head and it also provides the adjustment referred to above, whereas the corresponding adjustment of scales 10 is accomplished by other mechanism not shown.

With this platter, mailing tubes or other cylindrical articles are positioned directly over the center of the base member automatically, and they do not roll off. In addition a single package or envelope may be laid flat on platter 8 and when the package or envelope is small, the main support is on wall 16. A large envelope or package may have its broad side positioned on wall 14 so that it is with its edge against wall 16. Similarly, a stack of large envelopes may be placed on the platter with their broad sides parallel to wall 14 and with their edges resting on wall 16. A relatively large stack of small envelopes may be placed on the platter with their broad sides against wall 16 and with their edges resting against wall 14. In each case, the platter reliably supports the objects placed thereon and stacks of the envelopes or packages are held from falling over. Furthermore, with large packages or stacks of envelopes, the center of gravity of the stack is not displaced materially from directly over base member 20. Thus, the scales will be evenly loaded and a large number of envelopes or small packages may be weighed in an efficient and dependable manner.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. In postal scales, a mail-supporting platter assembly comprising, a base member having a vertical axis with a diametrically extending horizontal groove at its upper end formed by a first surface in a plane which is substantially thirty degrees from the horizontal and a second surface in a plane which is substantially sixty degrees from the horizontal, a platter member formed by a single sheet of metal bent to be snugly received in said groove and having two angularly disposed portions which rest respectively on said first and second surfaces with the portion resting on said second surface being substantially greater in width than the portion resting on said first surface, and means securing said platter member to said base member.

2. In postal scales, a mail-supporting platter assembly comprising, a cylindrical base member having a vertical axis with a diametrically extending horizontal groove at its upper end formed by a first surface in a plane which is substantially thirty degrees from the horizontal and a second surface in a plane which is substantially sixty degrees from the horizontal, a platter member formed by a single sheet of metal bent to be snugly received in said groove and having two angularly disposed portions which rest respectively on said first and second surfaces with the portion resting on said second surface being substantially greater in width than the portion resting on said first surface, a screw extending through said platter member and threaded into said base member, and a hexagonal cap-plug attached to the lower end of said base member and axially positioned with respect to said base member.

3. In postal scales, the combination of, a generally cylindrical base member having a vertical axis and also having a peripheral skirt on its lower end and a horizontal groove at its upper end formed by a first surface in a plane which is substantially thirty degrees from the horizontal and a second surface in a plane which is substantially sixty degrees from the horizontal, a cap-plug axially positioned with respect to said base member at the lower end thereof, a screw extending axially through said base member and threaded into said cap-plug, an adapted head which forms part of a balancing arm and which has an upwardly projecting portion which is recessed to receive said cap-plug and which is adapted to be snugly received within said skirt, a platter member formed by a single sheet of rigid material formed to be snugly received in said groove and having two angularly disposed portions which rest respectively on said first and second surfaces, and a screw extending through said platter member and threaded into said base member.

4. In postal scales, a mail-supporting platter unit comprising a base portion and a platter portion rigidly fixed together with the base portion having a vertical axis and being adapted at its bottom to be supported by postal scales with the center of support being on the axis of said base portion, said platter portion presenting two angularly disposed supporting surfaces which extend substantially to a line of intersection which extends diametrically with respect to the axis of said base portion, said platter portion being formed by two sheet portions one of which extends from said line of intersection a substantially greater distance than the other and extending at an angle to the horizontal which is substantially greater than the corresponding angle for the other, whereby a stack of letters or a rectangular package or the like will be received and firmly supported by said platter portion when placed on said platter unit and will have its center of gravity relatively close to the line of the axis of said base member.

ROBERT A. DOHL.

REFERENCES CITED

The following references are of record in the file of this patent:

UNITED STATES PATENTS

| Number | Name | Date |
| --- | --- | --- |
| 923,285 | Malone | June 1, 1909 |